(12) United States Patent
Yeh et al.

(10) Patent No.: US 8,046,786 B2
(45) Date of Patent: Oct. 25, 2011

(54) SPINDLE MOTOR AND OPTICAL DISC DRIVE HAVING THE SAME

(75) Inventors: Shih-Lin Yeh, Hsinchu (TW);
Chung-Chou Fan, Hsinchu (TW);
Chun-Lung Ho, Hsinchu (TW);
Wen-Hong Wang, Hsinchu (TW)

(73) Assignee: Philips & Lite-On Digital Solutions Corporation, Taipei (TW)

( * ) Notice: Subject to any disclaimer, the term of this patent is extended or adjusted under 35 U.S.C. 154(b) by 385 days.

(21) Appl. No.: 12/419,298

(22) Filed: Apr. 7, 2009

(65) Prior Publication Data

US 2010/0211964 A1 Aug. 19, 2010

(30) Foreign Application Priority Data

Feb. 18, 2009 (CN) .......................... 2009 1 0006456

(51) Int. Cl.
*G11B 17/028* (2006.01)
*G11B 17/03* (2006.01)
*G11B 19/20* (2006.01)

(52) U.S. Cl. ........................................ 720/697; 720/695

(58) Field of Classification Search .................. 720/695, 720/697

See application file for complete search history.

(56) References Cited

U.S. PATENT DOCUMENTS

| 5,457,588 | A | * | 10/1995 | Hattori et al. | 360/99.08 |
| 5,831,355 | A | * | 11/1998 | Oku | 310/12.31 |
| 6,097,121 | A | * | 8/2000 | Oku | 310/91 |
| 2005/0071860 | A1 | * | 3/2005 | Kim et al. | 720/695 |
| 2005/0086678 | A1 | * | 4/2005 | Miyamori et al. | 720/697 |
| 2006/0085807 | A1 | * | 4/2006 | Nishidate | 720/697 |

FOREIGN PATENT DOCUMENTS

JP 06189490 A * 7/1994

* cited by examiner

*Primary Examiner* — Ly D Pham
(74) *Attorney, Agent, or Firm* — Jianq Chyun IP Office

(57) ABSTRACT

A spindle motor includes a base plate, a stator, and a rotor. The base plate has a plurality of air-guiding holes. The stator includes a bearing portion and a plurality of coil portions. The bearing portion is fixed on the base plate. The coil portions are connected to and surrounded the bearing portion, and are disposed above the air-guiding holes. The rotor is rotatably mounted to the bearing portion and disposed adjacent the coil portions.

9 Claims, 3 Drawing Sheets

SPINDLE MOTOR AND OPTICAL DISC DRIVE HAVING THE SAME

CROSS-REFERENCE TO RELATED APPLICATION

This application claims the priority benefit of China application serial no. 200910006456.8, filed on Feb. 18, 2009. The entirety of the above-mentioned patent application is hereby incorporated by reference herein and made a part of specification.

BACKGROUND OF THE INVENTION

1. Field of the Invention

The present invention relates generally to a spindle motor and an optical disc drive employing the spindle motor, and more particularly, to a spindle motor with air-guiding holes and an optical disc drive employing the spindle motor.

2. Description of Related Art

Optical discs have gradually replaced conventional magnetic storage medium and become a type of indispensable optical storage medium for modern people due to the facts that the optical disc is inexpensive, easy to carry, large in storage size and easy for reservation, and can store data for a long time. Because of the widespread use of the optical discs, optical disc drives for reading the optical discs have also become a common and necessary electronic product.

In general, a traverse inside the optical disc drive is provided with a spindle motor for carrying an optical disc for high speed rotation and an optical pickup for reading data on the optical disc. The spindle motor usually includes a stator, a rotor, and a base plate. The base plate is mounted to the traverse and the stator is fixed to the base plate. The rotor is typically pivotably mounted with respect to the stator in a floating manner. In particular, the stator may include a bearing portion and a plurality of coil portions connected to a periphery of the bearing portion. The rotor may include a rotary shaft pivotably mounted in the bearing portion in a floating manner and an annular magnetic element disposed adjacent the coil portions. The annular magnetic element is, for example, a permanent magnet.

A user can place an optical disc on the spindle motor to rotate the optical disc. Since the optical disc is an external load from the perspective of the motor, in case of a high unbalance of the optical disc, the motor may bear a large external load thus causing an increased chance of contact and abrasion between the rotor and the stator. After a long term operation, the coil portions of the stator may generate a large amount of heat and conduct the heat to the bearing portion of the rotor thus causing deterioration of the quality of lubricating oil and degradation of the load capacity of the oil film in the bearing portion. This phenomenon may accelerate the wear between the rotor and the stator thus shortening the lifespan of the motor. In addition, with the rotating speed of the optical disc drive being increased, the spindle motor also generates more heat correspondingly, which may cause an overheat issue of the bearing portion to be more severe.

SUMMARY OF THE INVENTION

Accordingly, the present invention is directed to a spindle motor with improved heat dissipation efficiency and an optical disc drive employing the spindle motor.

The present invention provides a spindle motor including a base plate, a stator, and a rotor. The base plate has a plurality of air-guiding holes. The stator includes a bearing portion and a plurality of coil portions. The bearing portion is fixed on the base plate. The coil portions are connected to and surrounded the bearing portion and are disposed above the air-guiding holes. The rotor is rotatably mounted to the bearing portion and disposed adjacent the coil portions.

The present invention additionally provides an optical disc drive including a housing, a traverse, an optical pickup, and a spindle motor. The traverse is disposed inside the housing. The optical pickup is disposed on the traverse. The spindle motor is disposed inside the housing. The spindle motor includes a base plate, a stator, and a rotor. The base plate is mounted with the traverse and has a plurality of air-guiding holes. The stator includes a bearing portion and a plurality of coil portions. The bearing portion is fixed on the base plate. The coil portions are connected to and surrounded the bearing portion and are disposed above the air-guiding holes. The rotor is rotatably mounted to the bearing portion and disposed adjacent the coil portions.

According to one embodiment of the present invention, two adjacent coil portions have a gap formed therebetween, and the gap is positioned in correspondence with one of the air-guiding holes.

According to one embodiment of the present invention, the bearing portion has an axial hole, and the rotor includes a rotary shaft rotatably mounted in the axial hole.

According to one embodiment of the present invention, the rotor includes an annular magnetic element surrounding the stator.

According to one embodiment of the present invention, the rotor includes a support for supporting an optical disc.

According to one embodiment of the present invention, the optical disc drive further includes a tray disposed in the housing and adapted to be drawn out of the housing.

In view of the foregoing, in the optical disc drive of the present invention, the base plate of the spindle motor has a plurality of air-guiding holes disposed below the coil portions. The air-guiding holes can accelerate the air convection such that the heat generated by the coil portions can be taken out by the air convection, thereby enhancing the efficiency of dissipating the heat of the spindle motor and hence reducing the chance of failure of the spindle motor due to overheat.

In order to make the aforementioned and other features and advantages of the present invention more comprehensible, embodiments accompanied with figures are described in detail below.

DESCRIPTION OF THE EMBODIMENTS

Figure 1:
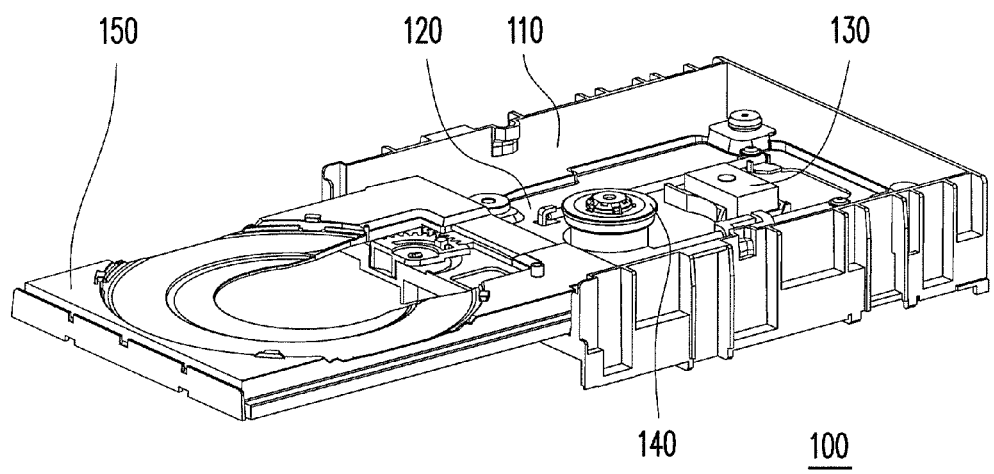
FIG. 1 is a perspective view of an optical disc drive according to one embodiment of the present invention.

FIG. 1 is a perspective view of an optical disc drive according to one embodiment of the present invention. Referring to FIG. 1, the optical disc drive 100 of the present invention includes a housing 110, a traverse 120, an optical pickup 130, and a spindle motor 140. The traverse 120 and the spindle motor 140 are disposed inside the housing 110. The optical pickup 130 is disposed on the traverse 120. In the present embodiment, the optical disc drive 100 further includes a tray 150 for carrying an optical disc. The tray 150 is disposed in the housing 110 and adapted to be drawn out of the housing 110 (the tray 150 is illustrated as being drawn out of the housing 110).

Figure 2:
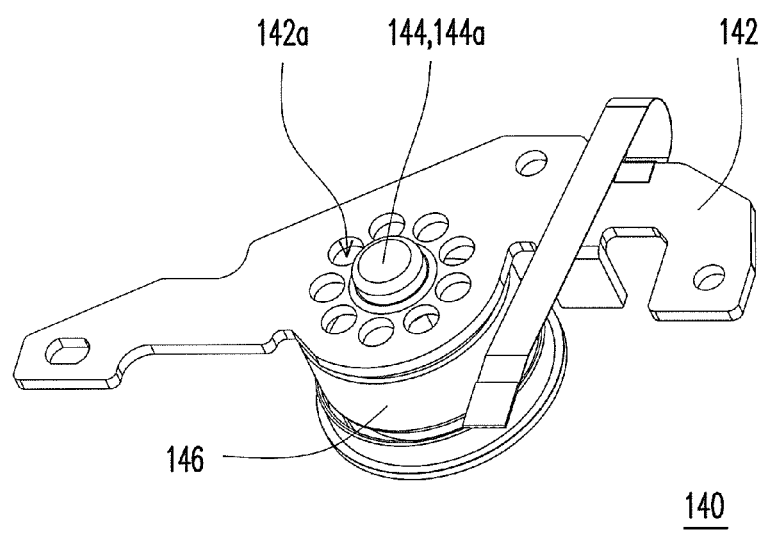
FIG. 2 is a perspective view of the spindle motor of FIG. 1.
Figure 3:
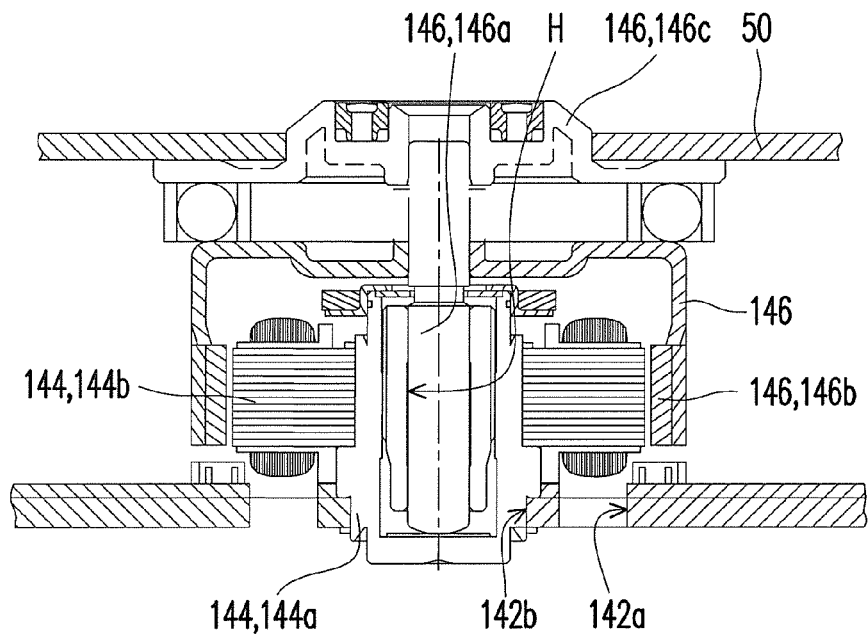
FIG. 3 is a partial cross-sectional view of the spindle motor of FIG. 2.

FIG. 2 is a perspective view of the spindle motor of FIG. 1. FIG. 3 is a partial cross-sectional view of the spindle motor of FIG. 1. Referring to FIG. 2 and FIG. 3, the spindle motor 140 includes a base plate 142, a stator 144 and a rotor 146. The base plate 142 is mounted on the traverse 120 and has a plurality of air-guiding holes 142a. The stator 144 includes a bearing portion 144a and a plurality of coil portions 144b. The bearing portion 144a is fixed on the base plate 142. The coil portions 144b are connected to and surrounded the bearing portion 144a, and are disposed above the air-guiding holes 142a. The rotor 146 is rotatably mounted to the bearing portion 144a and disposed adjacent the coil portions 144b. In the present embodiment, the spindle motor may further include a circuit board (not shown) disposed on the base plate 142 and electrically connected with the coil portions 144b to control operation of the spindle motor 140.

Referring to FIG. 3, when the coil portions 144b generate heat during operation of the spindle motor 140, the air-guiding holes 142a below the coil portions 144b can intensify the convection of air thus enhancing the heat dissipation efficiency. More specifically, when the spindle motor 140 drives the optical disc 50 to rotate, the rotating disc 50 causes a flow of air. The air-guiding holes 142a provide a path for the air to flow thus intensifying the convection of the air around the coil portions 144b, such that the heat generated by the coil portions 144b can be continuously taken out by the airflow.

Figure 4:
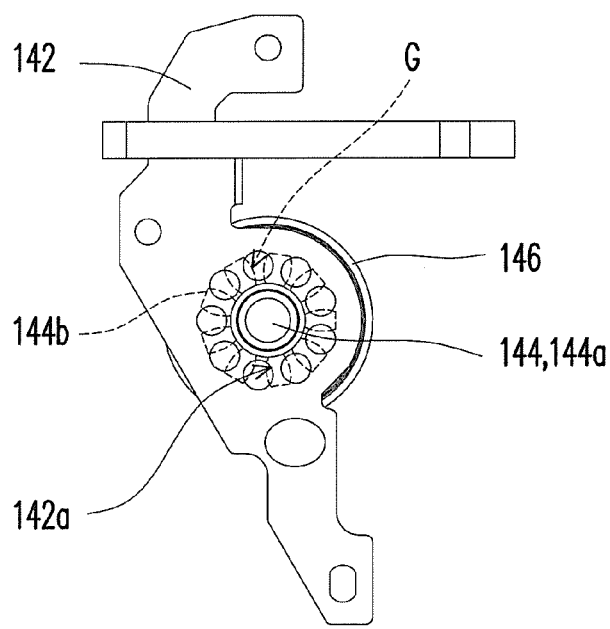
FIG. 4 is a bottom view of the spindle motor of FIG. 2.
Figure 5:
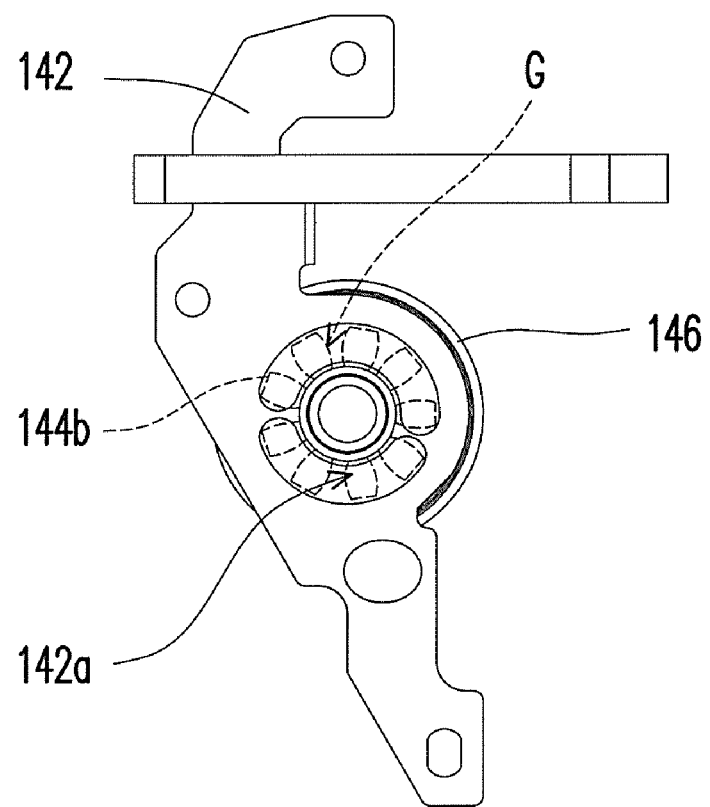
FIG. 5 illustrates a spindle motor according to another embodiment of the present invention.

FIG. 4 is a bottom view of the spindle motor of FIG. 1. Referring to FIG. 4, in the present embodiment, two adjacent coil portions 144b have a gap G formed therebetween and the gap G is positioned in correspondence with one of the air-guiding holes 142a. In other words, the multiple air-guiding holes 142a are disposed to respectively align with multiple gaps G between the coils portion 144b, which can cause a smoother airflow thus facilitating enhancing the convection and heat dissipation efficiency. In addition, while the air-guiding holes 142a are illustrated as being round-shaped in the present embodiment, they can be of another shape. For example, in an alternative embodiment not shown, the air-guiding holes can have another suitable shape such as oval, square or arcuate shape. While the air-guiding holes 142a are positioned in correspondence with the multiple gaps G between the coil portions 144b in the present embodiment, the number of the air-guiding holes 142a should not be limited to this particular embodiment described herein and could be two, three or four in alternative embodiments. As the number of the air-guiding holes 142a changes, the shape can also change. For example, FIG. 5 shows two air-guiding holes 142a which are arcuate shape.

Referring to FIG. 3, the bearing portion 144a has an axial hole H. The rotor 146 includes a rotary shaft 146a rotatably mounted in the axial hole H and an annular magnetic element 146b surrounding the stator 144. The annular magnetic element 146b is, for example, a permanent magnet. Besides, the rotor 146 further includes a support 146c for supporting the optical disc 50.

When the spindle motor 140 rotates, the stator 144 is stationary and the coil portions 144b of the stator 144 are excited by a current flowing therethrough to produce an electromagnetic field which interacts with the magnetic field of the annular magnetic element 146b to drive the rotor 146 to pivot relative to the stator 144. The coil portions 144b generate heat due to the continuous current flowing therethrough and the heat is conducted to the bearing portion 144a and the rotary shaft 146a. If the heat generated by the coil portions 144b is continuously accumulated and cannot be dissipated, the amount of heat conducted to the bearing portion 144a and the rotary shaft 146a is also continuously increased, which causes deterioration of the quality of lubricating oil, degradation of the load capacity of the oil film, and accelerated wear between the bearing portion 144a and the rotary shaft 146a. However, in the present embodiment, the base plate 142 is provided with the air-guiding holes 142a disposed below the coil portions 144b. The air-guiding holes 142a can be used in combination with the airflow effected by rotating of the rotor 146 and the optical disc 50 to accelerate the convection of the air around the coil portions 144b and hence enhance the heat dissipation efficiency, thereby reducing the possibility of wear caused by the overheat.

In summary, in the optical disc drive of the present embodiment, the base plate of the spindle motor has a plurality of air-guiding holes disposed below the coil portions. The air-guiding holes can accelerate the air convection such that the heat generated by the coil portions can be taken out by the air convection, thereby enhancing the efficiency of dissipating the heat of the spindle motor and hence reducing the chance of failure of the spindle motor due to overheat. In addition, each air-guiding hole can be positioned in correspondence with the gap between two adjacent coil portions, such that the air convection is smoother thus enhancing the heat dissipation efficiency.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A spindle motor comprising:
a base plate having a plurality of air-guiding holes;
a stator comprising:
　a bearing portion fixed on the base plate; and
　a plurality of coil portions connected to and surrounding the bearing portion and disposed right above the air-guiding holes; and
a rotor pivotably mounted to the bearing portion and disposed adjacent the coil portions, wherein the airflow generated by the rotating of the rotor flows through the air-guiding holes.

2. The spindle motor according to claim 1, wherein two adjacent coil portions have a gap formed therebetween, and the gap is positioned in correspondence with one of the air-guiding holes.

3. The spindle motor according to claim 1, wherein the bearing portion has an axial hole, and the rotor includes a rotary shaft rotatably mounted in the axial hole.

4. The spindle motor according to claim 1, wherein the rotor includes an annular magnetic element surrounding the stator.

5. The spindle motor according to claim 1, wherein the rotor includes a support for supporting an optical disc.

6. An optical disc drive comprising:
a housing;
a traverse disposed inside the housing;
an optical pickup disposed on the traverse; and
a spindle motor disposed inside the housing, the spindle motor comprising:
　a base plate mounted on the traverse and having a plurality of air-guiding holes;

a stator comprising:
    a bearing portion fixed on the base plate; and
    a plurality of coil portions connected to and surrounding the bearing portion and disposed right above the air-guiding holes; and
a rotor pivotably mounted to the bearing portion and disposed adjacent the coil portions, wherein the airflow generated by the rotating of the rotor flows through the air-guiding holes.

7. The optical disc drive according to claim 6, wherein two adjacent coil portions have a gap formed therebetween, and the gap is positioned in correspondence with one of the air-guiding holes.

8. The optical disc drive according to claim 6, wherein the bearing portion has an axial hole, and the rotor includes a rotary shaft rotatably mounted in the axial hole.

9. The optical disc drive according to claim 6, wherein the rotor includes an annular magnetic element surrounding the stator.

* * * * *